United States Patent [19]
Reiffin

[11] Patent Number: 5,694,603
[45] Date of Patent: Dec. 2, 1997

[54] COMPUTER MEMORY PRODUCT WITH PREEMPTIVE MULTITHREADING SOFTWARE

[76] Inventor: Martin G. Reiffin, 5439 Blackhawk Dr., Danville, Calif. 94526

[21] Appl. No.: 496,282

[22] Filed: Mar. 20, 1990

Related U.S. Application Data

[63] Continuation of Ser. No. 425,612, Sep. 28, 1982, abandoned, and Ser. No. 719,507, Apr. 3, 1985, abandoned.

[51] Int. Cl.$^6$ .................................................. G06F 9/46
[52] U.S. Cl. .................................................. 395/677
[58] Field of Search ................................. 395/800, 375, 395/650, 677, 678

[56] References Cited

U.S. PATENT DOCUMENTS

| | | | |
|---|---|---|---|
| 3,614,745 | 10/1971 | Poduin | 395/650 |
| 4,084,228 | 4/1978 | Dufond et al. | 395/650 |
| 4,383,307 | 5/1983 | Gibson, III | 395/575 |
| 4,513,391 | 4/1985 | Maddock | 395/146 |
| 4,671,684 | 6/1987 | Kojima et al. | 400/63 |
| 4,724,285 | 2/1988 | Lefler et al. | 178/21 |
| 4,773,009 | 9/1988 | Kucera et al. | 364/419 |
| 4,887,212 | 12/1989 | Zamora et al. | 364/419 |

OTHER PUBLICATIONS

Hiromoto, Robert, *Parallel-processing a large scientific problem*, AFIPS Press. 1981, pp. 235–237.
Ousterhout, John K., *Scheduling techniques for Concurrent Systems*, IEEE, 1982, pp. 22–30.
Andrews, Gregory R., *Synchronizing Resources*, ACM Transactions on Programming Languages and Systems, vol. 3, No. 4, Oct. 1981, pp. 405–430.
Collin, A. J. T., *The Implementation of STAB–1*, Software—Practice and Experience, vol. 2, 1972, pp. 137–142.
Artym, Richard, *The STAB Multiprocessing Environment for CYBA–M*, Software—Practice and Experience, vol. 12, 1982, pp. 323–329.
Treleaven et al., *Combining Data Flow and Control Flow Computing*, The Computer Journal, vol. 25, No. 2, 1982, pp. 207–217.
Duffie, C. A. III, *Task Scheduling Algorithm for a Teleprocessing Communications Controller*, IBM Technical Disclosure Bulletin, vol. 16, No. 10, Marcy 1974, pp. 3349–3352.
Hoare, C. A. R., *Towards a Theory of Parallel Programming*, Operating Systems Techniques, Proceedings of a Seminar held at Queen's University, Belfast, 1972, Aademic Press, 1972, pp. 61–71.
Cheriton, David Ross, *Multi–Process Structuring and the Thoath Operating System*, Doctoral Thesis, University of Waterloo, 1978.
Redell et al., *Pilot: An Operating System for a Personal Computer*, Communications of the ACM, Feb. 1980, vol. 23, No. 2, pp. 81–92.
Lampson et al., *Experience with Processes and Monitors in Mesa*, Communications of the ACM, Feb. 1980, vol. 23, No. 2, pp. 105–117.
Hughes, Lawrence, E., "System Programming Under CP/M–80," 1983, pp. 109–112 and 127–138.

*Primary Examiner*—Richard L. Ellis

[57] ABSTRACT

A multithreading computer system for the preemptive asynchronous concurrent execution of a plurality of instruction threads of a multithreaded application program. As an illustrative example of one of the many uses of the invention, the disclosed application program comprises a compiler thread and an editor thread. The compiler processes the source code while the programmer edits the source code at the keyboard. An interrupt sevice routine repeatedly activates the editor thread to provide a preemptive asynchronous editing process for either entry of new source code or modification of the previously entered code, while the compiler thread concurrently processes the source code during the time intervals between keystrokes. The interrupt service routine may be activated either by a keyboard interrupt or periodically by a clock at predetermined time intervals.

41 Claims, 9 Drawing Sheets

SYSTEM

COMPILER

EDITOR

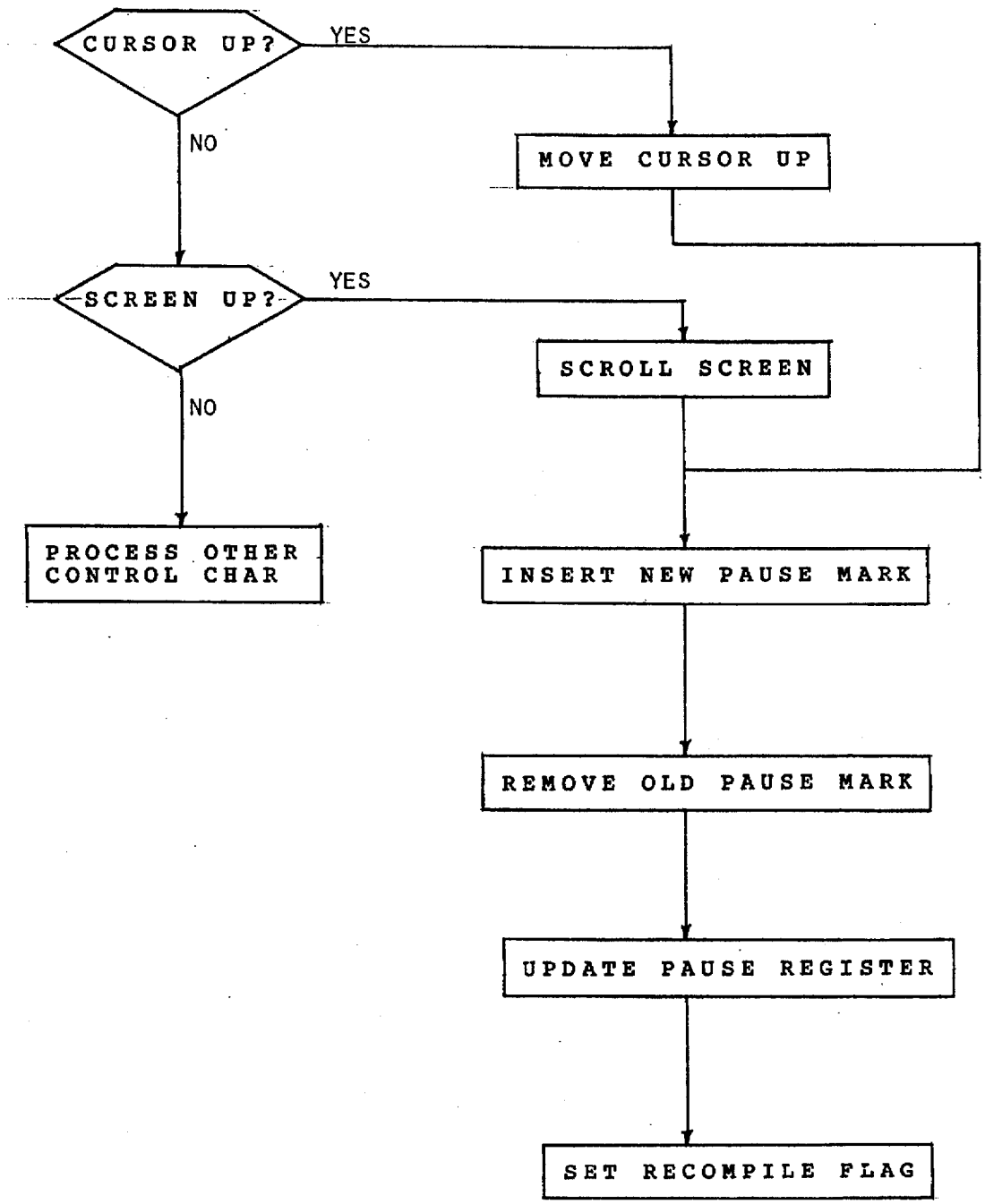

COMPUTER MEMORY PRODUCT WITH PREEMPTIVE MULTITHREADING SOFTWARE

PRIOR APPLICATION

This application is a continuation of my prior applications Ser. No. 06/425,612, filed Sep. 28, 1982, and Ser. No. 06/719,507, filed Apr. 3, 1985, both prior applications allowed but now abandoned and both originally titled "Computer System with Real-Time Compilation". The Detailed Description and FIGS. 1 to 6 of the drawings of the present application are intended to be identical to those of said prior applications. Therefore the present invention is entitled to an effective filing date of Sep. 28, 1982.

FIELD OF THE INVENTION

This invention relates to computer systems, and more particularly, to a novel computer memory product including program software interrupt-driven preemptive multi-threaded processing so as to enable, for example, providing real-time processing of language and other alphanumeric code concurrently as the code is being entered or edited at the console.

The term "multithreading" is used in this application in its ordinary generally understood sense to mean the concurrent time-sliced preemptive execution of a plurality of threads of instructions located within the same single operator-selected application program, whereby during execution of the program each thread may have at various times direct access to the same program address space, and with at least one thread invoked by a periodic clock-activated interrupt service routine which upon each activation asynchronously and pre-emptively takes control of the central processing means away from an executing thread at a repetition rate sufficiently fast so that even where the system contains only a single central processor the concurrent theads appear to execute effectively simultaneously and are so perceived by the user.

SUMMARY OF THE INVENTION

A software program comprises a plurality of executable instruction sequences each having direct access to the same program address space. The execution of each sequence is termed a "thread". A clock or timer periodically activates an interrupt operation of the central processor. Each interrupt preempts an executing thread after the thread has executed for a brief timeslice during which the thread may have performed only a portion of its task. Control of the processor is thereby taken away from the preempted thread, and control then passes to an interrupt service routine which then passes control to another thread to invoke the latter for execution during the next timeslice. Control of the processor is thereafter returned to the preempted thread to enable the latter to resume execution at the point where it was previously interrupted. The threads are thus executed concurrently with each thread executed in its respective series of successive spaced timeslices. Control of the central processor is thus transferred repeatedly back and forth between the threads so rapidly that the threads are run substantially simultaneously and are so perceived by the user. The threads may thus execute incrementally and piecewise with their successive task portions executed alternately in a mutually interleaved relation and with each thread executed during its respective series of spaced timeslices interleaved with the timeslices of at least one other thread.

To illustrate one of the many uses of the novel multi-threading mode of operation of the invention there is disclosed an embodiment providing for real-time processing of data code concurrently as the code is being entered at the keyboard by an operator. In this illustrative example, one of the program threads is an editor and another thread is a code processing routine in the form of a compiler. As the operator strikes keys at the keyboard the compiler thread executes between each successive pair of keystrokes to process the entered source code concurrently with the editing operation. By the time the operator has finished entering or editing the code the compiler thread will have completed most of the required processing, thereby freeing the operator from lengthy periods of waiting for extensive code processing.

In this illustrative embodiment the interrupt operation of the central processor is periodically activated by a timer or clock. Each interrupt operation asynchronously preempts the executing compiler thread and passes control of the central processor to an interrupt service routine. The input port is then polled to test if a key has been struck at the keyboard. If not, the interrupt is terminated and control returns to the compiler thread. If polling the port reveals that a key has been struck then the interrupt service routine invokes the editor thread which takes control of the central processor to perform a character code entry or other edit operation. For most applications the periodic clock interrupt preemptions at predetermined fixed time intervals may be provided at a fixed frequency in the range of about every 10 to 30 milliseconds which will generally be fast enough to keep up with keys stroked at the keyboard.

BACKGROUND OF THE ILLUSTRATIVE EMBODIMENT

The language or other alphanumeric code processed by the present invention may be either a natural language such as English, or a formal language such as a programming language, or the numbers and strings of a spreadsheet or database. Both natural and formal languages are generally written in the same ASCII code, and the methods of lexical and syntactic analysis and the mode of operation of the present invention are substantially the same for both natural and formal languages. Spreadsheet and database entries are also generally entered in ASCII code or the equivalent binary code. For purposes of illustration of the structure and operation of the present invention the disclosed embodiment is shown and described herein as a processor of a formal language; that is, a compiler of a programming language. However, it will be understood that substantially the same structure, operation, and lexical and syntactic analyses may be employed to process the code of a natural language, such as, for example, by utilizing lexical analysis to determine correct spelling and/or syntactic analysis to determine correct grammar of the natural language code being entered by an editor or word processor, or to process the code of a spreadsheet or database. The term "data" in the phrase "data code" is used to distinguish the language code or other code being processed from the instruction code which is executed by the central processing unit to perform the processing.

Since humans write programs in a formal programming language and computers execute only machine language, it is frequently necessary to translate from one language to the other. When the programming language is "high level", that is abstract in the sense that it does not explicitly manipulate the computer registers and other hardware, the translation of the original program is performed by another program called a "compiler". The original program is called the "source code", and the resulting program translation is called the "object code".

In addition to translation, the compiler must also perform lexical, syntactic and semantic analyses of the source code.

Lexical analysis is performed by a "scanner" and is the process of grouping a sequence of source code bytes into symbols or tokens and determining their correctness, somewhat like grouping a sequence of characters into English words. If the sequence of bytes does not constitute a properly spelled symbol an error message is emitted. These symbols are then subjected to the syntactic analysis by a "parser" which determines if they are arranged in a relation which conforms to the rigid grammatical rules of the programming language. The semantic analysis determines if the symbols conform to additional rules which cannot be conveniently expressed by the language grammar.

These analyses are very much like parsing the words of an English sentence. If the sequence of symbols violates a syntactic or semantic rule an "error" is said to have been committed and the compiler must so inform the programmer by emitting a visible "error message".

After translation the resulting object code is usually "linked" and "loaded", processes in which it is joined with other object code modules to form a complete machine code program which may be executed by the computer.

DESCRIPTION OF THE PRIOR ART OF COMPILERS

Since the detailed description of the present application discloses the present invention, for purposes of illustration, as implemented in the form of a compiler, a better understanding of the invention may be had by first considering the prior art of compilers.

In recent years the large increase in software costs, the lack of skilled programmers, the rapid expansion of the computer market, the widespread adoption of microcomputers, and the underutilization of much available hardware because of lack of software, have compelled the adoption of high-level languages and concerted efforts to make their use more efficient.

However, programming in a high-level language is still slow, tedious and inefficient. For example, even under the optimum conditions of an interactive console, a compiled language requires a repeated sequence of steps comprising loading the editor, writing or editing the source code, loading the compiler, executing the compiler, loading the linker, executing the linker, running the program, and repeating the sequence when an error is indicated during compilation of the source code or execution of the object code. During much of the time the programamer is compelled to wait for completion of the loading or execution steps, and this waiting time is both wasteful and boring. As a result, the programming process is slow and expensive.

Similar inconveniences arise in the entry and editing of natural language code when using editors or word processors. If the operator desires to check the spelling or grammar of the language code being typed or edited the operator must interrupt the entry or editing operation and invoke a lexical analyzer to check the spelling or a syntactic analyzer to check the grammar. The inconvenience is such that the checking is usually not done until after the job is finished, so that the same errors of spelling and grammar are repeated throughout the document being entered. Similar problems arise in the entry and editing of alphanumeric code in spreadsheets. For example, after even a single change is made in any numeric cell the user must wait until the entire speadsheet is recalculated.

SUMMARY OF THE DISCLOSED ILLUSTRATIVE EMBODIMENT

The following is a summary description of a compiler implementation disclosed for purposes of illustration of one of the forms which the invention may take in practise.

The programmer invokes the real-time compiler-editor system by typing its command file name at the keyboard console. The command file containing the software portion of the system is then read into memory from a disk. The source buffer, a memory region which is to contain the source code, is initialized so that its first stored byte is a predetermined code which will be called a "Pause Mark". Execution of the compiler then begins by reading the Pause Mark as the character in the first location of the buffer. When the compiler reads the Pause Mark it will enter an infinite loop repeatedly reading the same location until the content of this location is changed by the editor to a blank (space).

When the programamer strikes a key on the console keyboard the central processor unit executes the following interrupt sequence described for an 8080 or Z80 microprocessor: Upon completion of the instruction currently being executed the processor will enter the interrupt mode and communicate its new status to the system by emitting an interrupt acknowledge signal.

Upon recept of this signal the interrupt hardware gates an RST instruction onto the data bus. The processor then executes the RST instruction which is a one-byte call to a selected location in low memory where there is stored a jump instruction ("vector") to the interrupt service routine comprising the editor.

The interrupt service routine first saves the stack pointer and other CPU registers. If the struck key corresponds to an alphanumeric or other non-control character the latter is placed into the second location of the source code buffer immediately after the Pause Mark. The buffer pointer is then advanced to the next location, the CPU registers are restored, the CPU interrupt enabled, and the RET (return) instruction executed to return control to the compiler.

The compiler continues to execute its infinite loop in which it repeatedly reads the Pause Mark character in the first location of the source code buffer. This sequence is repeated as the programmer strikes additional keys at the keyboard, the successive characters being entered into successive locations in the source code buffer as the buffer pointer advances. This sequence continues until a key corresponding to a control character is struck.

If this control character is a carriage return the corresponding code (13) is inserted into the buffer, the buffer pointer is advanced, the Pause Mark code is then inserted into the buffer location adjacent the carriage return code, and the original Pause Mark code in the first location is replaced by the code (32) for a blank space. The Pause Mark location has thus been advanced from its original point to the end of the first line of the source code.

Upon return to the compiler from the interrupt service routine the compiler pointer accesses the first buffer location and reads the code for a space instead of the Pause Mark. The compiler will then repeatedly advance its pointer to the next buffer location and perform its lexical, syntactic and semantic analyses on the first line of source code stored in the buffer. The compiler may either display an error message or emit compiled object code, as may be appropriate, until the compiler pointer reaches the new Pause Mark inserted at the end of the first line of source code.

When it reaches the new Pause Mark the compiler again enters an infinite loop without advancing the pointer until the editor eventually moves the Pause Mark to the end of the next line, whereupon the compiler is free to compile this next line of source code.

Control characters other than a carriage return may be entered by striking appropriate keys to perform the conventional editing functions of a screen editor. For example, errors in the present line of source code may be corrected by moving the cursor backward. This does not affect the compiler which cannot advance beyond the Pause Mark at the end of the previous line.

However, if by hitting the appropriate control key the cursor is moved upwardly one or more lines to a position before the Pause Mark this sets a Recompile Flag so as to enter a recompile mode. In this event, upon return to the compiler the latter is reinitialized so that it may recompile the source code from the very beginning of the source buffer. Subsequent editing or source text insertions cause the editor to move the Pause Mark to an updated location adjacent the end of the line preceding the most recently edited line.

When the compiler finds a syntax error in the source code it displays an error message. The programmer may then edit the source so as to correct the error. Upon return from the editor the compiler is reinitialized to recompile the source code.

The entered source code and emitted object code are preferably stored in memory so that disk accesses will not unduly interfere with the editing and compilation processes. If the source or object code buffer gets filled its contents may be stored in a disk file in the conventional manner as employed by editors and word processors such as CP/M ED and Wordstar. The use of bank-select memory schemes or the advent of 16-bit microprocessors with their larger memory space will obviate the need for disk storage until the compilation is finished.

It will be obvious to those skilled in the computer arts that the same or equivalent hardware and software may be employed to perform lexical and syntactic analyses of natural language code, or to calculate the numeric code of a spreadsheet, concurrently in real time as the user enters or edits such code at the keyboard.

DESCRIPTION OF THE DRAWINGS

FIG. 6 is a flowchart showing the sequence of operations of the control-character routines of the editor;

DETAILED DESCRIPTION

The following is a detailed description of a preferred embodiment of the invention. The disclosed details are merely illustrative of one of the many forms which the invention may take in practise. The invention and novelty reside in neither the hardware nor the software taken separately, but rather in the novel combination of both.

Figure 1:
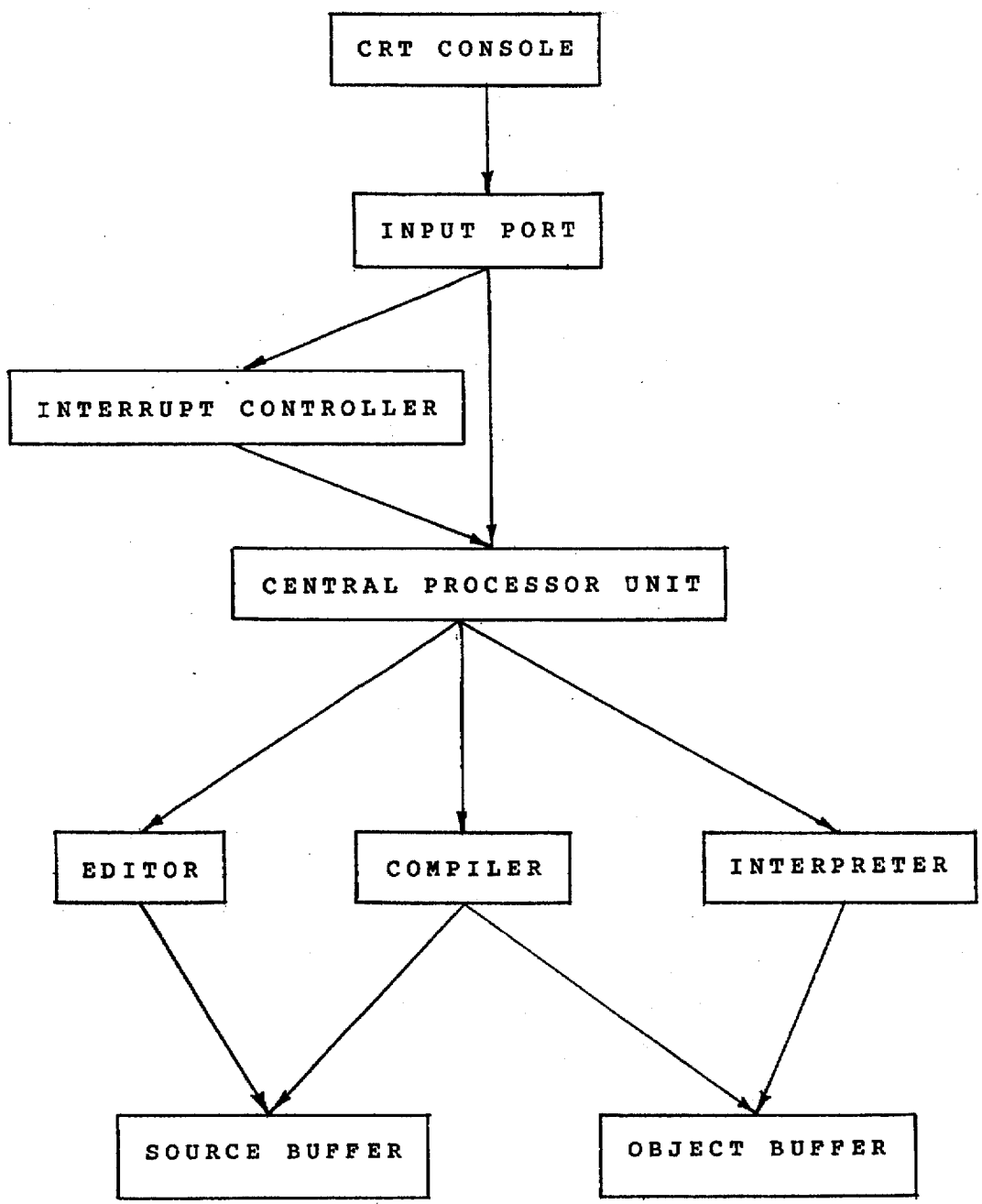
FIG. 1 is a schematic diagram showing the relation of the major hardware components constituting an embodiment of the computer system in accordance with the present invention.
Figure 1A:
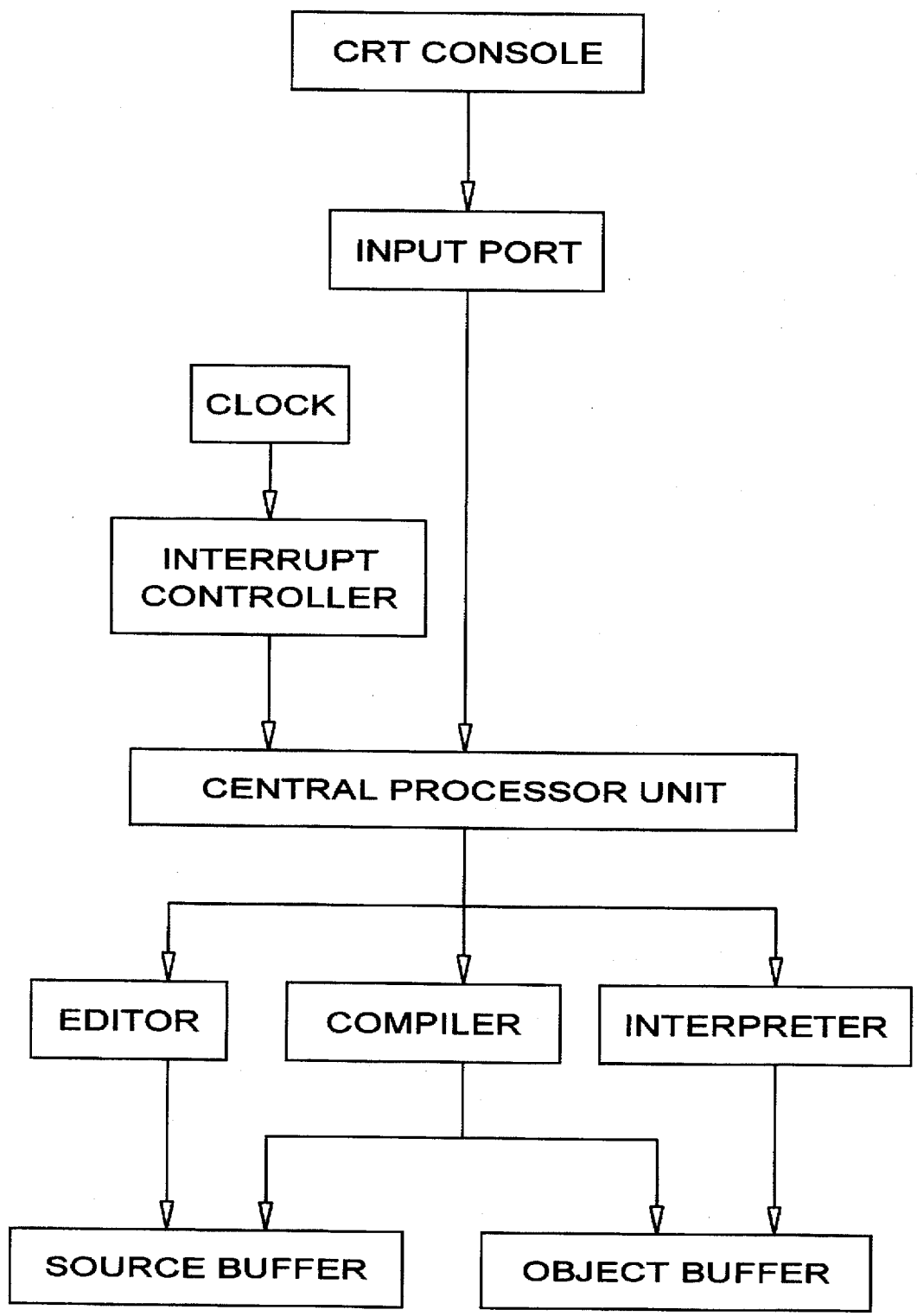
FIG. 1a is a schematic diagram similar to FIG. 1 but showing a modified embodiment wherein the interrupt is periodically activated by a clock.

Referring first to FIG. 1 and to FIG. 1a (except for the clock-activated interrupt modification to be described later below), there are shown the major hardware components constituting the overall system of a preferred embodiment of the present invention. Each component will be referred to by the legend shown in the respective rectangle of the drawing.

The CRT CONSOLE refers to any suitable terminal having a keyboard for entry of the source code to be compiled and also for entry of editing commands to change the code. The terminal also comprises a video display for implementation of a screen editor. The keyboard is preferably integral with the video display to form a unitary console having an RS-232-C serial link to the remainder of the system.

This serial link is connected to the INPUT PORT which is preferably embodied as a UART (univeral asynchronous receiver transmitter) such as, for example, the 1602, AY-5-1013, or TMS 5501. Each keystroke on the keyboard of the CRT CONSOLE results in the serial transmission to the UART of a train of bits constituting the ASCII byte corresponding to the struck key. The UART reforms the bits into that byte which is then transmitted in parallel on the data bus to the accumulator of the CPU (central processor unit). The UART also provides an output port. Execution of an OUT command by the CPU results in the transmission on the data bus of a byte from the accumulator to the UART which may then serially transmit the byte to the CRT CONSOLE for display on the video screen.

In the usual operating mode of a conventional microcomputer system the status of the input port is repeatedly tested by the central processor unit in a polling loop until the input port status indicates that a byte of data has been received and is available in the UART received data register. The present invention employs instead an interrupt mode of operation whereby the CPU normally executes the compiler until the UART receives a byte from the CRT CONSOLE. The compiler is stored in an area of main memory designated in FIG. 1 as COMPILER.

The data available line of the UART is then activated and this in turn activates the INTERRUPT CONTROLLER to cause the CPU to execute the editor. The latter is stored in an area of main memory designated in the drawing as EDITOR. Upon entry of the received character into the SOURCE BUFFER in main memory, or upon completion of an editing command, a RET (return) instruction is executed by the CPU to cause it to resume its execution of the COMPILER from the point where it was interrupted.

As the COMPILER is executed it preferably performs lexical, syntactic and semantic analyses of the program source code stored in the SOURCE BUFFER. In the preferred embodiment the COMPILER also emits object code and stores it in the OBJECT BUFFER. Upon completion of entry and compilation of the source code program, control of the CPU may be passed to the INTERPRETER for execution of the object code if the latter is in the form of intermediate code. The programmer may be given the option of saving the source code and/or object code in secondary storage such as disk or tape media. Instead of generating intermediate code ("p-code") for interpretation, the compiler may be of the type that emits executable machine code. The COMPILER may require only a single pass through the source code, in the manner of the usual recursive descent Pascal compiler. If the COMPILER requires more than one pass the first pass should preferably perform the syntax analysis so as to reveal all syntax errors.

The interrupt facility enables the programmer to stop execution of the machine code program at any time, examine the values of the variables, and then continue execution. No additional hardware is required for this extra function, and the extra software is minimal.

Figure 2:
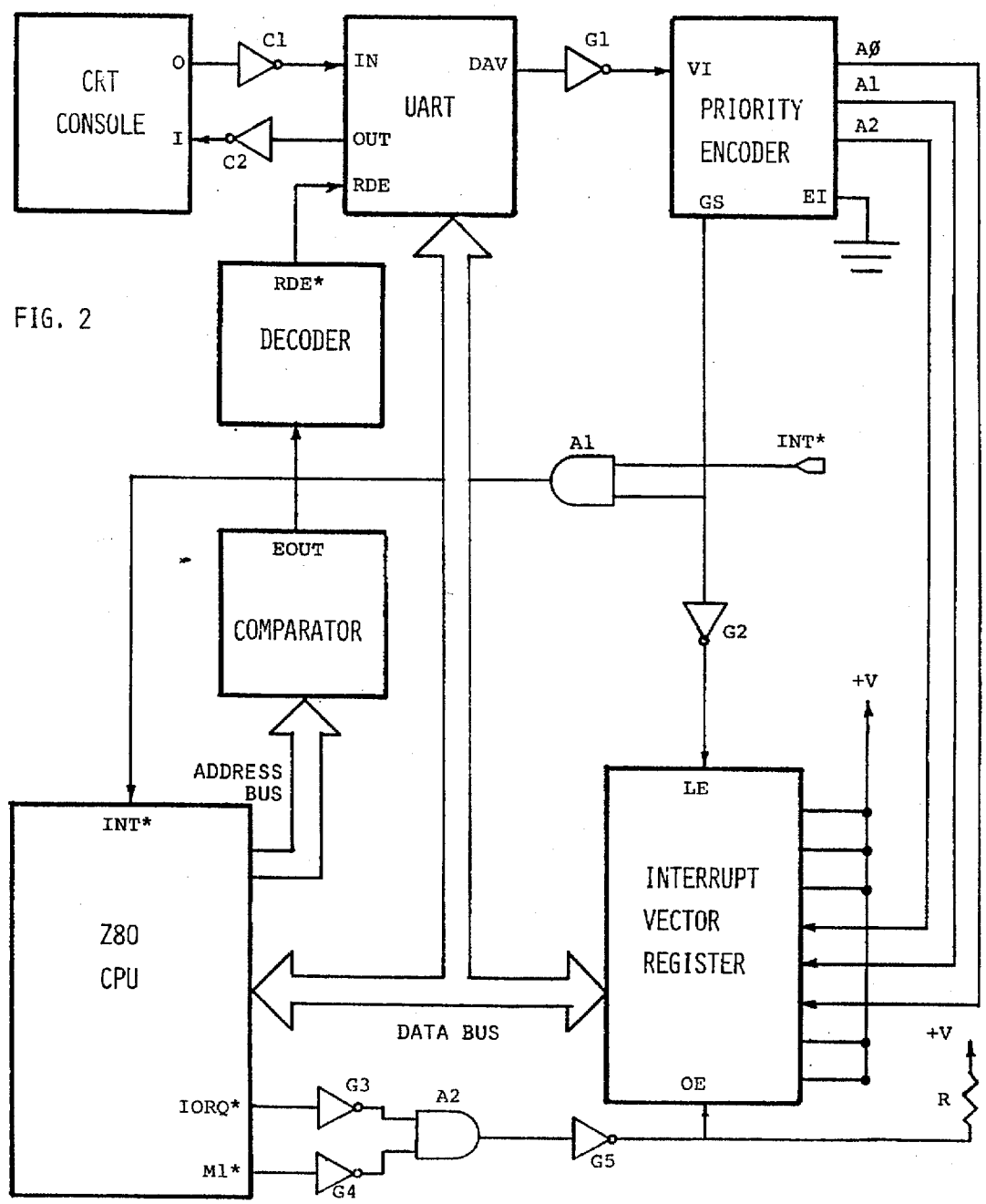
FIG. 2 is a diagram showing the interrupt logic and circuitry of the system hardware.
Figure 2A:
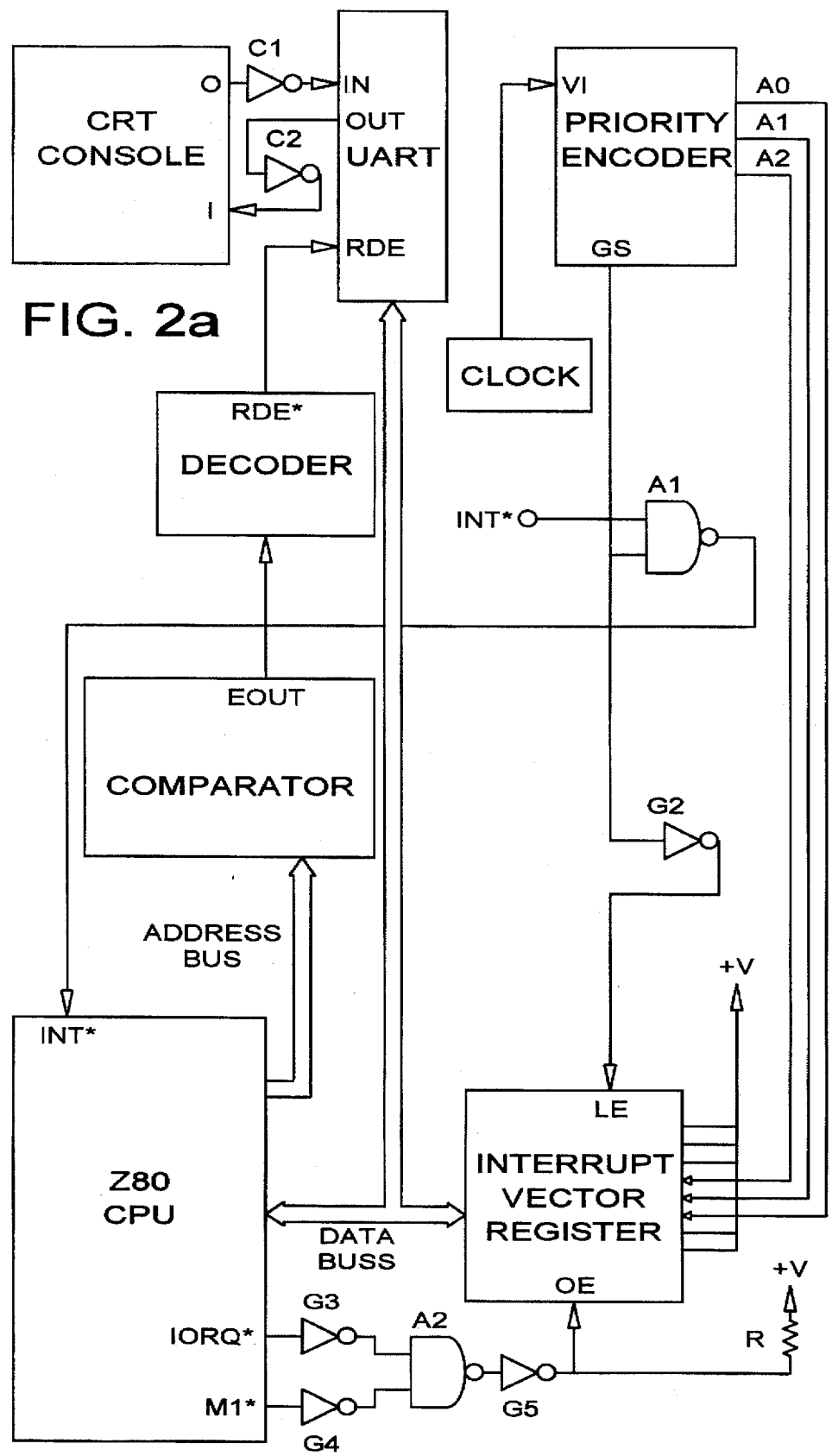
FIG. 2a is a diagram similar to FIG. 2 but showing said clock-activated embodiment.

Referring now to FIG. 2 and to FIG. 2a (except for the clock-activated interrupt modification to be described later below), there are shown the circuitry and hardware components directly involved in the interrupt operation. Upon striking a key of the CRT CONSOLE a train of pulses constituting the byte corresponding to the struck key is emitted from the RS-232-C serial port 0. A converter gate C1 converts the pulse train from RS-232-C levels to TTL (transistor-transistor-logic) levels to match the requirements of input port IN of the UART. The latter forms the serial pulse train into an eight-bit byte which is stored in the received data register of the UART. The latter then outputs a data available signal at pin DAV which signal is transmitted by gate G1 to a vectored interrupt input VI of the PRIORITY ENCODER.

Although only one input pin VI of the latter is shown, it will be understood that this chip has other vectored interrupt input pins to which other interrupting devices may be connected. The PRIORITY ENCODER arbitrates competing interrupt requests at its inputs and determines the request having the highest priority. The enable input EI of the PRIORITY ENCODER is grounded as shown.

Assuming that the interrupt request from the CONSOLE and the UART win the priority contest, the ENCODER then transmits a three-bit code A0,A1,A2 to the respective inputs of the INTERRUPT VECTOR REGISTER. The other five inputs of the latter are held positive by potential source +V, so that the resulting byte input to this register chip constitutes an RST call instruction. The signal at output pin GS of the PRIORITY ENCODER is transmitted by gate G2 to the latch enable input LE of the INTERRUPT VECTOR REGISTER to cause the latter to latch the RST call instruction into its internal flip-flops.

Activation of output pin GS of the PRIORITY ENCODER also transmits an interrupt signal through AND gate A1 to the interrupt request pin INT* of the Z80 CPU. Assuming that the interrupt of the processor is enabled, upon completion of the present instruction the CPU's status pins IORQ* and M1* are activated and their signals are transmitted by gates G3,G4 to AND gate A2 to form the INTA (interrupt acknowledge) signal. The latter is inverted by gate G5 and fed to the output enable pin OE of the INTERRUPT VECTOR REGISTER, whereupon the RST call instruction at the inputs of the latter is jammed onto the DATA BUS.

The RST instruction is then input to and executed by the Z80 CPU, causing the latter to push the contents of the program counter onto the stack, and further causing the CPU to jump to a predetermined location in low memory. This location stores a "vector" or three-byte JMP (jump) instruction to an interrupt service routine. The latter includes the editor as well as a subroutine to store the contents of the CPU registers. Control of the CPU is then retained by the editor until either a character has been entered into the source code buffer or an editing operation has been completed.

The editor includes an input instruction which when executed causes the CPU to place the address of the UART's port on the ADDRESS BUS. This address is tested by the COMPARATOR, and if it matches that of the port, the output pin EOUT is activated to signal the DECODER. The latter is controlled by other control and status signals (not shown) in the conventional manner so as to transmit a signal RDE* to the corresponding input RDE of the UART. The byte in the received data register (not shown) of the UART is then gated onto the DATA BUS and transmitted to the accumulator within the CPU.

In the preferred embodiment of the invention shown in FIG. 2 the integrated circuits may be implemented as follows:

UART: 1602
PRIORITY ENCODER: 74LS148
INTERRUPT VECTOR REGISTER: 74LS373
DECODER: 74LS155
COMPARATOR: 25LS2521
C1: 1489
C2: 1488

Figure 3:
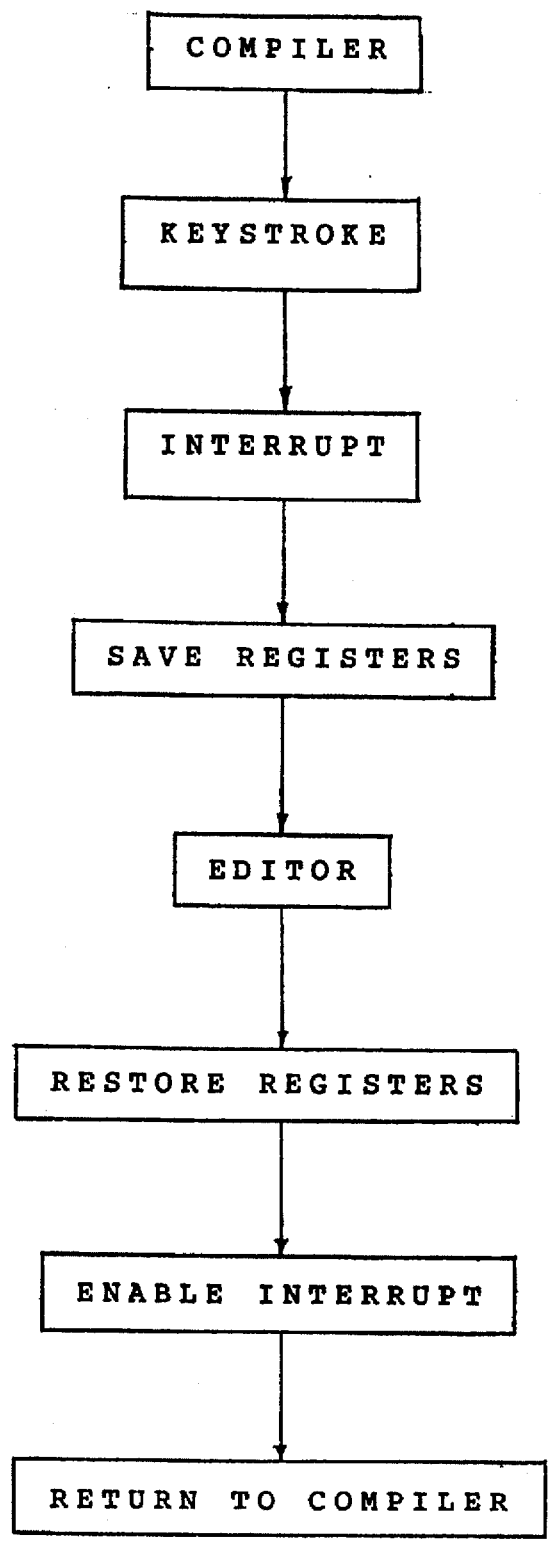
FIG. 3 is a flowchart showing the sequence of operations of the illustrative compiler implementation.
Figure 3A:
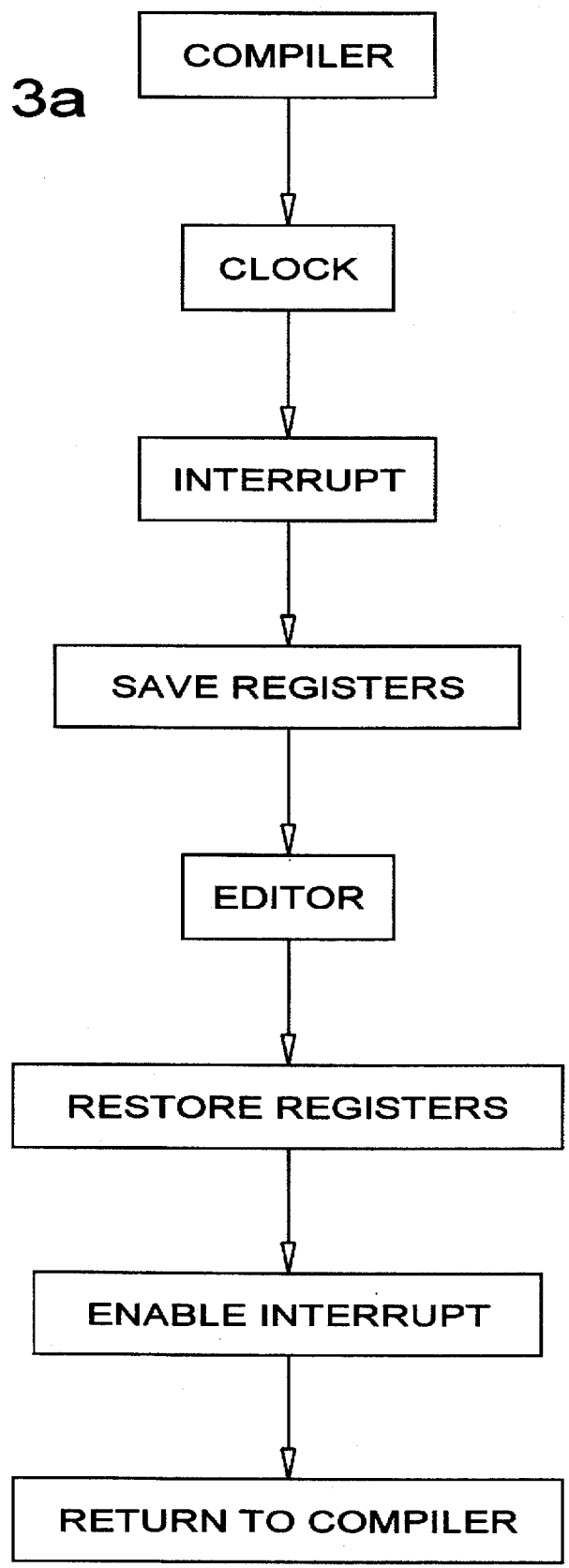
FIG. 3a is a flowchart similar to FIG. 3 but showing said clock-activated embodiment.

Referring now to FIG. 3 and to FIG. 3a (except for the clock-activated interrupt modification to be described later below) there is shown the sequence of operations of the overall system. The COMPILER normally has control of the CPU and either is in an infinite loop upon reaching a Pause Mark in the source code buffer or is in the process of analysing the source code in the buffer.

The occurrence of a KEYSTROKE at the terminal causes an INTERRUPT, whereupon the CPU is vectored to the interrupt service routine. The latter includes a subroutine to perform the SAVE REGISTERS procedure shown in the drawing.

The EDITOR is then executed by the CPU. If the KEYSTROKE corresponds to a control character, then an editing procedure such as a cursor movement, screen scroll, character deletion, or line deletion is performed. If the KEYSTROKE corresponds to an alphanumeric character or other valid source code character the latter is entered into the source code buffer and displayed on the video screen, and the screen cursor is advanced to the next character position.

The interrupt service routine then jumps to its subroutine to perform the RESTORE REGISTERS procedure whereby the registers of the CPU are restored to their original values at the instant of the interrupt.

The ENABLE INTERRUPT instruction (EI) is then executed by the CPU so that the latter may respond to the next interrupt. Finally the RET instruction is executed so that the CPU may RETURN TO COMPILER. The compiler then resumes execution from the point where it was interrupted.

Figure 4:
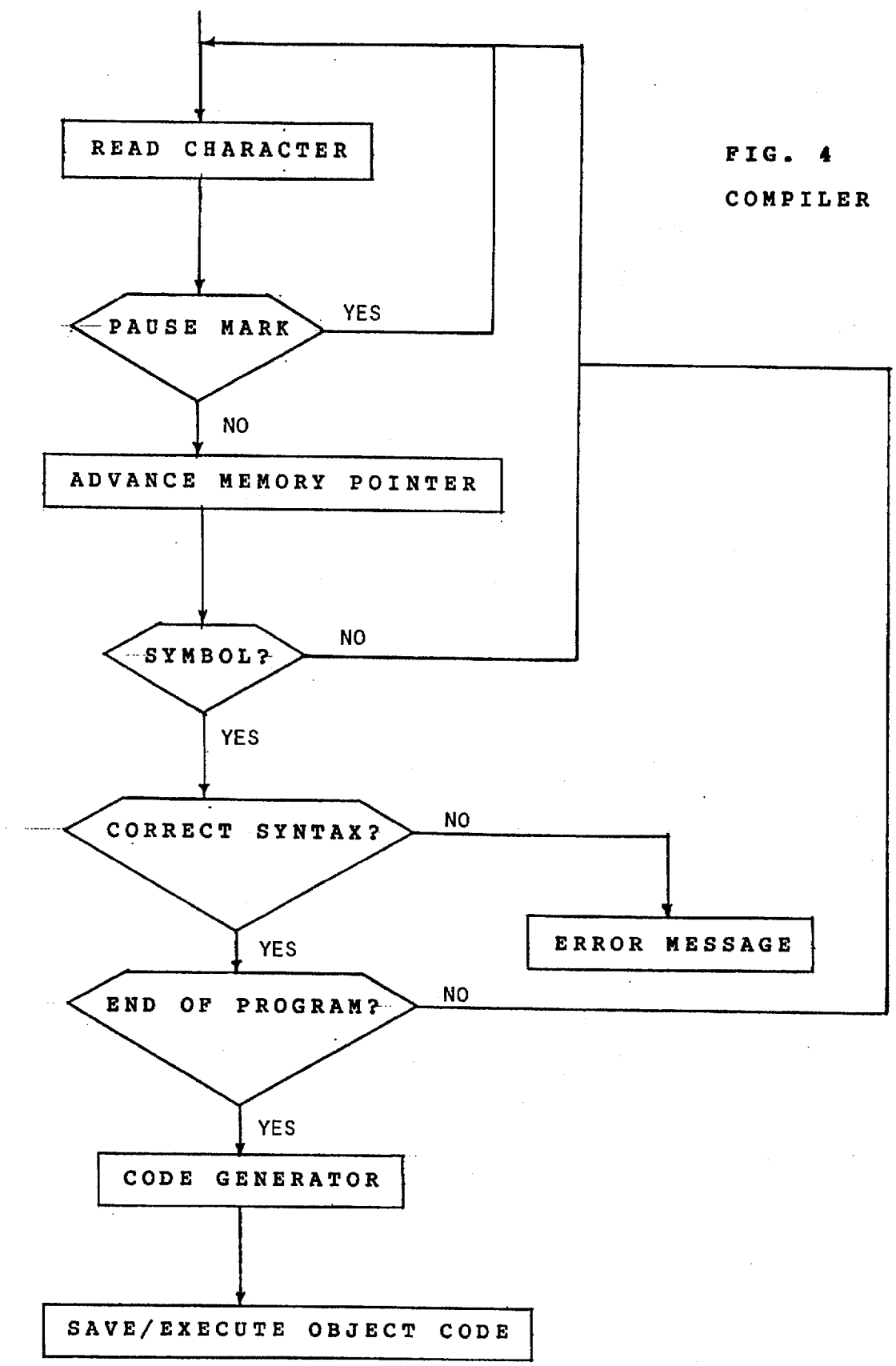
FIG. 4 is a flowchart showing the sequence of operations of the compiler.

Referring now to FIG. 4, there is shown the sequence of operations of the compiler. After initialization, the compiler first performs its READ CHARACTER function whereby the byte in the first location of the source code buffer is read.

If this byte is the predetermined code designated as the Pause Mark the compiler pointer does not advance and the compiler enters an infinite loop wherein it continues to read the same location until the content of this location is changed by the editor to a blank. When this change occurs the compiler memory pointer is incremented to the next location of the buffer so that the compiler exits from its Pause loop, as indicated by the legend ADVANCE MEMORY POINTER.

As indicated by SYMBOL?, the lexical analyser of the compiler then determines if the source character read in constitutes the last character of a symbol, such as an identifier, operator or punctuation mark. If not, the READ CHARACTER function is executed again until a symbol is recognized.

The syntax analyser of the compiler then determines if this symbol conforms to CORRECT SYNTAX in accordance with the grammar of the programming language. If the symbol does not conform to the syntax an ERROR MESSAGE is displayed.

If the syntax is correct, the READ CHARACTER function is repeated until an error is found or the END OF PROGRAM is reached. In this event the CODE GENERATOR may be invoked if this function is performed as a separate pass. Alternatively, code generation may be performed concurrently with the lexical and syntactical analyses. The generated code may then be saved on disk and/or executed, at the option of the programmer, as indicated by the legend SAVE/EXECUTE OBJECT CODE.

For clarity in illustration it will be shown how the simple and widely-published compiler PL/0 of Prof. N. Wirth (*Algorithms+Data Structures=Programs*, Chapter 5, Pp.280–347, 1976, Prentice-Hall,Inc.) may be modified for implementation in the present invention. In the description below the following identifiers have been added and do not appear in the original PL/0 compiler as published: CONT, PEEK, RECOMPILE, PTR, PM and SP.

The first statement in the modified compiler is:

IF NOT CONT THEN

The boolean variable CONT is FALSE upon initial entry into the compiler signifying that this is not a continuation of a previous execution. That is, the compiler has just been entered for the first time during the present session. The subsequent assignment statements are therefore executed to initialize the contents of the arrays WORD, WSYM, SSYM, MNEMONIC, DECLBEGSYS, STATBEGSYS and FACBEGSYS shown at Pages 346, 347 of the Wirth treatise (Ref. 12). The values of these arrays remain fixed throughout execution of the compiler and the above conditional IF statement obviates the need to re-execute all of these assignment statements upon subsequent re-initializations of the compiler for recompilations. That is, after the first test of the variable CONT it is set equal to TRUE so as to bypass the assignment statements thereafter when recompilation is required.

After the conditional block of array assignments a PEEK assembly language function is invoked to read the content of the memory location immediately preceding the start of the source code buffer, in which location is stored the recompile flag. If this location has had the ASCII code for the letter 'R'stored therein by the editor then a compiler procedure RECOMPILE is invoked to reinitialize the variables ERR, CC, CX and LL, and to assign the value of constant AL (10) to the variable KK.

The RECOMPILE procedure also sets the value of a pointer variable PTR equal to the address of the beginning of the source code buffer. The pointer PTR is the memory pointer of the compiler's lexical analyser and is successively advanced from byte to byte of the source code to read the latter. The lexical analyser reads in the byte in the memory location pointed to by the pointer PTR.

The lexical analyser embodies another major change in the PL/0 compiler. It is embodied in the procedure GETSYM which also has nested therein the procedure GETCH.

GETSYM has as its first statement:

WHILE CH=' ' DO GETCH;

This constitutes part of an infinite loop which repeats for as long as the procedure GETCH returns the ASCII code (32) for a space. As explained below, the procedure GETCH will return the space code 32 whenever it reads the Pause Mark.

GETCH has as its first statement:

CH:=PTR^;

so as to read into the variable CH the contents of the source memory location pointed to by the pointer variable PTR. The next statement of GETCH is:

IF CH=CHR(PM) THEN thereby testing if the byte read is the Pause Mark PM which is a constant equal to 35. This value was chosen because it is a visible character and was otherwise unused.

Following the IF clause is the assignment:

CH:=CHR(SP)

where SP is equal to the ASCII code (32) for a space. Control then returns to GETSYM where the condition of the WHILE clause is satisfied so that it again invokes GETCH. This sequence is repeated and results in an infinite loop for as long as the byte in the memory location being read is the Pause Mark.

After the editor changes that byte from the Pause Mark to the ASCII code for a space the loop will be broken because the boolean condition of the IF clause will no longer be satisfied (variable CH will no longer equal PM). Instead the following ELSE clause will be executed so as to advance the source memory pointer PTR to the next memory location by the statement:

PTR:=PTR+1;

whereafter the next invocation of GETCH will read the next source memory locaton to enable the compiler to continue its advance through the source code. The pointer PTR is repeatedly advanced with each successive call of GETCH until it reaches the new Pause Mark inserted by the editor, Referring to below.

Figure 5:
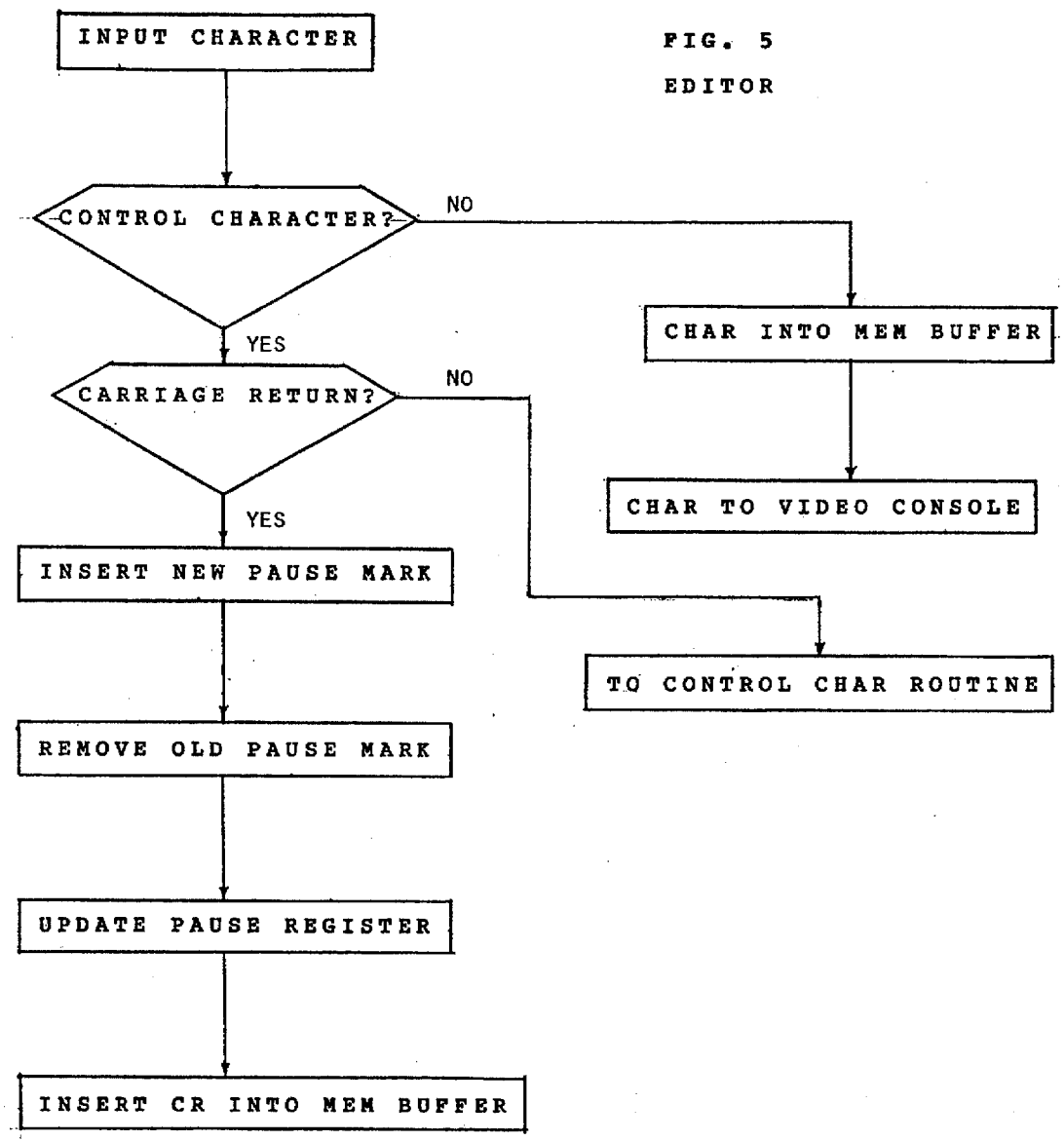
FIG. 5 is a flowchart showing the sequence of operations of the editor.

Referring to FIG. 5, there is shown the sequence of operations of the editor. The INPUT CHARACTER function is first performed in response to the KEYSTROKE (FIG. 3). The editor then determines if the input byte is a CONTROL CHARACTER. If not, the character is entered into the source code buffer as indicated at CHAR INTO MEM BUFFER. The input character is also displayed on the screen as indicated at CHAR TO VIDEO CONSOLE. If the input character is a control character, the editor then determines if it is a CARRIAGE RETURN? If not, the appropriate one of the editor's routines for handling control characters is called, as indicated by the legend TO CONTROL CHAR ROUTINE, and as described below with reference to FIG. 6.

Still referring to FIG. 5, if the input character is a carriage return then a new Pause Mark is written into the source code buffer adjacent the end of the current line, as indicated at INSERT NEW PAUSE MARK. The old Pause Mark is changed to a blank (space), as indicated by the legend REMOVE OLD PAUSE MARK.

For convenience in finding the location of the Pause Mark subsequently, a memory word location is reserved as a Pause Register for storage of the location address of the Pause Mark. The address of the new Pause Mark is thus stored in this memory register, as indicated by the legend UPDATE PAUSE REGISTER. The ASCII code for a carriage return (13) is then entered into the source code buffer adjacent the Pause Mark, as indicated by INSERT CR INTO MEM BUFFER. The ASCII code for a line feed (10) may be entered after the carriage return if this convention is desired.

Referring now to FIG. 6, there is shown the sequence of operations of the editor routines for handling control characters input at the console. The input character is first tested to determine if it is the code for the CURSOR UP operation. If not, it is then tested to determine if it is the code for the SCREEN UP operation. If not, the input control character is handled in a conventional manner which will not be further described, as indicated by the legend PROCESS OTHER CONTROL CHAR.

If the input control character is the code for the CURSOR UP or SCREEN UP then the respective operation MOVE CURSOR UP or SCROLL SCREEN is performed. In the former case the cursor is moved up one line on the video screen. In the latter case the screen is erased and is rewritten to display those lines of the source code buffer immediately preceding the erased lines.

As indicated at INSERT NEW PAUSE MARK, a new Pause Mark is inserted adjacent the end of the source code buffer line immediately preceding the line now bearing the new cursor position. The operations REMOVE OLD PAUSE MARK and UPDATE PAUSE REGISTER are then performed in the same manner as described above with respect to FIG. 5.

The operation SET RECOMPILE FLAG causes reinitialization of the compiler when the latter resumes control of the CPU after return from the interrupt service routine. This flag is preferably a memory location wherein a predetermined code may be stored to inform the compiler that recompilation of the source code is required.

In the preferred embodiment this recompile flag is set to require recompilation whenever the cursor is moved up or the screen frame is scrolled up. That is, it is assumed that whenever the cursor is moved to point to source code which may have already been compiled that this code will be changed so as to require recompilation.

An alternative method would be to set the recompile flag only if the previously compiled code is actually changed, since it is possible that the programmer may scroll the screen up and then scroll down again without making any change in the source code.

Another alternative would be to maintain a memory register holding the address of the latest position of the compiler pointer. The editor might then compare this address with that of the source location pointed to by the cursor to determine if the editing changes are being made to source code which has already been compiled.

Although these alternative schemes result in fewer recompilations, the preferred embodiment has the advantage of simpler implementation. Furthermore, the compilation process is so much faster than the manual typing of source code at the console that the compiler will recompile all but the largest programs and catch up with the programmer before the programmer can type more than a few new lines of code. Therefore the reduction of the number of recompilations to the absolute minimum is not essential.

The editor is written in Pascal with calls to sixteen external assembly language procedures and functions. Those routines unique to the present invention will now be described.

Upon entry to the editor the boolean variable ECONT is tested to determine if this invocation of the editor is the first entry of the present session or a continuation. If ECONT is FALSE then it is set equal to TRUE and the following procedures are called: INIT, NEWFILE, VECTOR and TOPL0.

The procedure INIT clears the source code buffer, sets the memory pointer to the start of the buffer, inserts the Pause Mark at the first location of the buffer, sets the contents of the Pause Register to the address of this first location, initializes the cursor to the first row and first column of the screen, and sets the recompile flag pointer to the memory location preceding the first byte of the buffer.

The procedure NEWFILE prompts the programmer to select either a new file for entry of source code or an old file for editing. If the latter, the file is read into the source code buffer from a disk and the first screen of source code is displayed.

The procedure VECTOR calls the external assembly procedure POKE three times to store in low memory (20H) the jump vector to a subroutine SAVREGS which stores the contents of the CPU registers. In response to an interrupt activated by a keystroke at the console the CPU executes the RST4 call instruction and executes this jump vector and then the SAVREGS subroutine. After the registers are saved a jump instruction in the subroutine sends the CPU to the editor.

The TOPL0 procedure passes control to the PL/0 compiler. It is usually called after the editor has completed the character entry or editing function corresponding to the key struck at the terminal. In this case the procedure is called after initialization of the editor.

The next statement of the editor is not reached until an interrupt occurs in response to a keystroke. This statement reads into a variable the ASCII code input from the UART's received data register. This input byte is tested to determine if it is a control character or alphanumeric character (greater than 31). If the latter it is entered into the source code buffer and displayed on the video screen in the conventional manner.

If the input byte is either the control code for moving the cursor down or for scrolling the screen frame down, the appropriate procedure is called and concludes with an invocation of the procedure UPDATE. The latter enters into the source buffer a new Pause Mark adjacent the end of the old line in the case of a cursor down operation, and adjacent the end of the invisible line preceding the first displayed line in the case of a scroll down operation. The procedure UPDATE also removes the old Pause Mark by substituting the ASCII code for a space (32) in place of the Pause Mark in the old location of the latter. The Pause Register is also updated to the address of the new Pause Mark location.

If the input byte is either the control code for moving the cursor up or for scrolling the screen frame up toward the beginning of the source, the corresponding procedure is called to perform the respective operation. This procedure concludes with invocations of the previously described procedure UPDATE and also the procedure RECOMPILE. The latter stores the ASCII code for the letter 'R' in the memory location immediately preceding the start of the source code buffer so as to constitute the recompile flag noted above. Upon completion of the cursor up operation or the screen scroll up operation the CPU will return to the compiler which will test the recompile flag, determine that the flag is set, and then call its reinitialization procedure to force the compiler to recompile the source code from the beginning of the source buffer.

If the input byte is the ASCII code for a carriage return (13) the procedure CRET is called. This routine enters into the source buffer a new Pause Mark adjacent the carriage return code, removes the old Pause Mark, and updates the Pause Register, among other more conventional functions such as adding a line feed code to the buffer, updating the cursor, and scrolling the video display if the present line is the last line of the screen.

It should be understood that the preferred embodiment described above and shown in the drawings is merely illustrative of one of the many forms which the invention may take in practise, and that numerous modifications thereof may be made by those skilled in the art without departing from the scope of the invention as defined in the appended claims.

For example, instead of the Pause Mark implemented as a predetermined code entered into a memory location within the source code buffer, the pause location may be defined for the compiler by a memory address stored in a register. The compiler may then be prevented from analysing code stored in memory locations beyond this address which may be incremented and decremented by the editor.

Furthermore, the interrupt which causes control of the CPU to pass from the compiler to the editor may be activated by a timer or clock instead of by the keyboard, as shown in FIGS. 1a to 3a. That is, the compiler may be periodically interrupted and the input port polled to test if a key has been struck. If not, the interrupt is terminated and control returns to the compiler. If polling the port reveals that a key has been struck then the interrupt service routine editor takes control and is executed in the manner described above for the disclosed preferred embodiment. For most applications clock interrupts at intervals of about every 10 to 30 milliseconds should be frequent enough to keep up with keys stroked at the keyboard.

Furthermore, the recompile flag may be set whenever the compiler determines that the source code contains an error. That is, it may be assumed that whenever an error is revealed the source code will be changed so as to require recompilation.

Another possible modification is to eliminate the requirement of recompilation from the very beginning of the source code in those instances where the error occurs in the last completed line of source code. During the compilation of the line the resulting register values, table entries, stack manipulations, variable assignments and code buffer entries are temporarily stored and are not finally entered until the syntax analysis of the source line is completed and determines that the line conforms to the grammar. If the line contains an error these temporary entries are discarded and the compiler pointer is moved back to the end of the previous line, thereby obviating recompilation. However, this scheme will still require recompilation if source lines previous to the last line are modified.

Still another possibility would be to have the editor advance the Pause Mark after entry of each character or after entry of each delimited symbol. This would have the advantage of revealing an error almost instantly upon its entry at the keyboard, instead of waiting until completion of the current line. The disadvantage would be that recompilation would be required for every minor typing error without giving the programmer a chance to correct it before it is scanned and parsed.

I claim:

1. A computer-readable disk memory having a surface formed with a plurality of binary patterns constituting a multithreaded application program executable by a desktop computer having a central microprocessor, a memory, means for loading said application program into a defined address space of said memory, and a clock-driven periodically-activated interrupt operation providing a plurality of series of spaced timeslices with the timeslices of each series interleaved with the timeslices of at least one other series, said multithreaded program comprising a plurality of sets of instructions with each set executable by said microprocessor to provide a respective thread of execution and with each thread having a respective task to perform, a first of said sets of instructions executable to provide a first thread of execution having control of the central microprocessor during each successive timeslice of a first series of timeslices with successive portions of the task of said first thread performed during respective successive timeslices of said first series, said first thread of execution being periodically preempted in response to activations of said interrupt operation at predetermined fixed time intervals at a fixed frequency in the range of about every ten to thirty milliseconds so as to provide a preemption at each termination of a timeslice of said first series by said clock activation of said interrupt operation, and a second of said sets of instructions executable to provide a second thread of execution and responsive to said periodic preemptions to acquire control of the central microprocessor during successive timeslices of a second series of timeslices with successive portions of the task of said second thread performed during respective successive timeslices of said second series, whereby a preemptive multithreading mode of operation is provided for the concurrent execution of a plurality of instruction threads of the same program with each thread executing successive incremental portions of its task during successive timeslices of a respective series of spaced timeslices and with the successive executed task portions of each thread interleaved with the successive executed task portions of at least one other thread so as to provide concurrent execution of a plurality of threads of the same program, each of said threads having direct access to said program memory address space so as to provide fast efficient preemption of one thread by another thread and switching of control of the central microprocessor back and forth among the threads at a rate so rapid that the threads execute effectively simultaneously, thereby enabling a single microprocessor to simulate the parallel processing of a large complex mainframe computer having multiple central processing units.

2. A disk memory as set forth in claim 1 to provide interactive multithreading with a desktop computer having a user operable input device and a video display monitor, and wherein one of said threads comprises instructions executable immediately in response to said user operable input device for interactively controlling the execution of said one thread, said one thread further comprising instructions for activating said display monitor to display the effects of said interactive control by said user operable input device, whereby said one thread executes interactively with the user in the foreground while another thread of the same program executes in the background concurrently with said one thread with control of the central microprocessor repeatedly switching back and forth between the threads, and wherein said fast efficient preemption provided by said direct access by the threads to said memory address space enables control of the central microprocessor to be switched between the threads so rapidly that an interactive user perceives the foreground and background threads to be executing simultaneously and without any perceptible interference by the background thread with the user's interaction with the foreground thread.

3. A disk memory as set forth in claim 1 to provide interactive multithreading with a desktop computer having an interactive user-operable input device for transmitting information from an interactive user and a monitor screen for displaying information to the user, wherein said second set of instructions comprises instructions executable immediately in response to said user-operable input device for entering said transmitted information and for interactively displaying on said screen the effects of said entered information, said first set of instructions comprises instructions executable to process said entered information concurrently in real time as the information is being transmitted by said user-operable input device, and whereby said second thread executes in the foreground interactively with and visibly to the user while concurrently therewith said first thread executes in the background, said control of the central microprocessor switching among the threads so rapidly that the user perceives that both threads appear to be executing simultaneously and without any perceptible interference by the background thread with the user's interaction with the foreground thread.

4. A disk memory as set forth in claim 3 for use in a desktop computer wherein said user-operable device is a keyboard having keys which may be struck repeatedly with a time interval between each pair of successive keystrokes and with the timeslices of said first series occurring during said time intervals between keystrokes, and wherein said first thread of instructions is executed during said time intervals between succesive keystrokes on the keyboard, whereby a user may enter information at the keyboard while concurrently therewith the entered information is being processed in real time by said first thread of instructions during the timeslices between successive keystrokes.

5. A disk memory as set forth in claim 1 wherein said second set of instructions comprises editor means for entering language code, and said first set of instructions comprises means for analyzing said language code for conformity with the rules of a language.

6. A disk memory as set forth in claim 5 wherein said means for analyzing said language code comprises a scanner for lexical analysis of the language code for determining if said code consist of a sequence of properly spelled words in accordance with lexical rules of the language.

7. A disk memory as set forth in claim 5 wherein said means for analyzing said language code comprises a parser for syntactic analysis of the language code for determining if said code conforms to the grammatical rules of the language.

8. A computer-readable memory having stored therein a multithreaded program including a plurality of sets of instruction codes with each set executable to provide a respective thread of execution of a desktop computer having a single central microprocessor, an interrupt operation, and clock means for periodically activating said interrupt operation at predetermined time intervals to provide a plurality of series of spaced timeslices of thread execution with the timeslices of each series interleaved with the timeslices of at least one other series, said plurality of sets of program instruction codes comprising a first set of instruction codes executable by said central microprocessor under control of the latter to provide a first thread of execution during each timeslice of a first series of said timslices, said first thread of execution being periodically preempted in response to activations of said interrupt operation at a frequency in the range of about every ten to thirty milliseconds, a second set of instruction codes responsive to said periodic activations of said interrupt operation to acquire control of said central microprocessor and said second set of instruction codes being executable by the central microprocessor to provide a second thread of execution during the timeslices of a second series of said timeslices interleaved with said first series of timeslices, control of the microprocessor thereby switching back and forth among the threads at a rate so rapid that the threads execute effectively simultaneously.

9. A memory as set forth in claim 8 for use with a desktop computer having an interactive user operable device, and wherein one of said threads comprises instructions executable interactively with a user in response to said user operable device for interactively controlling the execution of said one thread, whereby said one thread executes interactively with the user in the foreground while another thread of the same program executes in the background concurrently with said one thread with control of the central microprocessor repeatedly switching back and forth between the threads so rapidly that an interactive user perceives the foreground and backgrounds to be executing simultaneously.

10. A memory as set forth in claim 8 for use with a desktop computer having a user-operable device for transmitting information from an interactive user, and wherein said second set of instructions comprises means interactive with a user and responsive to said user-operable device for entering said transmitted information, and said first set of instructions comprises means to process said entered information concurrently in real time as the information is being transmitted by said user-operable device, whereby said second thread executes in the foreground while concurrently therewith said first thread executes in the background so that the user perceives that both threads appear to be executing simultaneously while control of the central microprocessor is rapidly switching back and forth among the plurality of threads of the same program.

11. A disk means as set forth in claim 10 for use in a desktop computer wherein said user-operable device is a keyboard having keys which may be struck repeatedly with a time interval between each pair of successive keystrokes and with the timeslices of said first series occurring during said time intervals between keystrokes, and wherein said first thread of instructions is executed during said time intervals between succesive keystrokes on the keyboard, whereby a user may enter information at the keyboard while concurrently therewith the entered information is being processed in real time by said first thread of instructions.

12. A computer-readable disk means encoded with a plurality of concurrently executable threads of instructions constituting a multithreaded computer application program to control the execution of a desktop microcomputer having an interrupt operation, a clock timer for periodically activating said interrupt operation, and memory means for storing a body of data, said encoded executable instructions comprising a first thread of instructions executable by the microcomputer and including means to process said stored body of data, at least a second thread of instructions for preemptively taking control of the microcomputer in response to said periodic activations of said interrupt operation by said clock timer and including means to process said stored body of data for a brief time interval after each said preemption, and said first thread of instructions repeatedly regaining control of the computer after each said time interval so that said first thread of instructions resumes processing said body of data at the point where it had been previously preempted, whereby said threads of instructions execute concurrently in a multithreaded mode of operation.

13. A disk means as set forth in claim 12 wherein said second thread of instructions comprises means for changing said body of data while said body of data remains stored in said memory means.

14. A disk means as set forth in claim 13 wherein said means for changing said stored body of data comprises editor instructions executable by said computer for editing said body of data while said body of data remains stored in said memory means, said body of data comprising words of a language, said first thread comprising means for checking the spelling of said words stored within said memory means.

15. A disk means as set forth in claim 12 for use with a computer having a display and wherein said program comprises operator responsive means for interactively controlling the execution of at least one of said program threads during the execution of said one thread, and means for controlling said display for interactively showing to the operator the effects of said operator responsive control, whereby a thread of a program may execute interactively with the operator in the foreground while another thread of the same program executes in the background concurrently with the interactive execution of the foreground thread so that an interactive operator perceives the foreground and background threads to be executing simultaneously.

16. A computer software memory element encoded with a plurality of binary patterns constituting a multithreaded program having a plurality of threads of instructions executable by a computer having a single central processor, a clock-driven periodically-activated interrupt operation providing a plurality of series of spaced timeslices with the timeslices of each series interleaved with the timeslices of at least one other series, and an interrupt service routine including a thread scheduler invoked in response to each activation of said interrupt operation to determine whether a currently non-executing thread of instructions should preempt another thread of instructions then currently having control of the central processor, said multithreaded program comprising a first thread of instructions executable by said central processor in successive increments during each of a first series of said timeslices, and at least a second thread of instructions to take control of the central processor in response to determinations by said thread scheduler at each of those activations of said interrupt operation when said scheduler has determined that said second thread should preempt said first thread, so that said second thread is executed by and controls said central processor in successive increments during those second series timeslices selected by the scheduler in accordance with the respective determination at each interrupt operation, whereby said program controls the single central processor to execute at least two threads of instructions concurrently with the successive execution increments of a thread interleaved with the successive execution increments of at least one other thread.

17. A computer memory element as set forth in claim 16 for use with a computer having an interactive user operable device and a video display monitor, and wherein said second thread is responsive to said thread scheduler to preempt said first thread in response to each respective activation of said interrupt operation occurring immediately after each instance when the user has operated said user operable device, said second thread comprises instructions executable interactively with a user in response to operation of said user operable device for interactively controlling the execution of said second thread, said second thread further comprising instructions for activating said monitor to display the effects of said interactive operation of said user operable device, whereby said second thread executes interactively with the user in the foreground while said first thread of the same program executes in the background concurrently with said second thread with control of the single central processor repeatedly switching back and forth between the threads so rapidly that an interactive user perceives the foreground and backgrounds to be executing simultaneously.

18. A computer-readable storage means encoded with computer-executable instructions constituting a multithreaded program to control a desktop computer system having a microprocessor with an interrupt input, a memory, and clock means to periodically activate said interrupt input and thereby periodically preempt an executing thread, said program instructions comprising a first thread of instructions of said program executable by said microprocessor and including means to perform a first subtask, a second thread of instructions of the same program executable by the same microprocessor and including means to perform a second subtask, and means for imparting control of the microprocessor central processing unit to said first thread of instructions and thereby initiating execution of said first thread of instructions by said microprocessor, said second thread of instructions preempting said first thread of instructions and acquiring control of the microprocessor in response to said periodic preemptive activations of said interrupt operation by said clock means, thereby to provide periodic execution of said second thread of instructions by said microprocessor after each said execution of said second thread of instructions said first thread of instructions regains control of the microprocessor and resumes execution at the point where it had been previously preempted, said program having an address space consisting of a range of memory address locations, said threads having direct access to said program address space so as to provide switching of control of the microprocessor among the threads at a rate so rapid that the threads execute effectively simultaneously thereby enabling a single microprocessor to simulate the parallel processing of a large complex mainframe computer having multiple central processing units.

19. A storage means as set forth in claim 18 for use with a computer having a user operable device and a video display monitor, and wherein one of said threads comprises instructions executable interactively with the user in the foreground in response to said user operable device for interactively controlling the execution of said one thread, said one thread further comprising instructions for activating said monitor to display the effects of said interactive control by said user operable device, another of said threads executing non-interactively in the background, whereby said one thread executes interactively with the user in the foreground while said another thread of the same program executes in the background concurrently with said one thread with control of the microprocessor repeatedly switching back and forth between the threads so rapidly that an interactive user perceives the foreground and backgrounds to be executing simultaneously.

20. A storage means as set forth in claim 18 for use with a computer having a monitor screen, and wherein said second set of instructions comprises instructions for interactively displaying information on said screen, and said first set of instructions comprises instructions executable to process said information concurrently in real time as the information is being displayed.

21. A storage means as set forth in claim 20 for use in a computer having a keyboard with keys which may be struck repeatedly with a time interval between each pair of successive keystrokes, and wherein said first thread of instructions is executed during said time intervals between succesive keystrokes on the keyboard, whereby a user may enter information at the keyboard while concurrently therewith the entered information is being processed in real time by said first thread of instructions.

22. A computer-readable disk store encoded with a plurality of concurrently executable sequences of program instructions constituting a multithreaded computer application program to control the execution of a computer having a central processing unit including an interrupt operation, a clock timer for periodically activating said interrupt operation, and a memory for storing a body of data code, said encoded executable program instructions comprising at least two sequences of instructions within the same program with each sequence executed by the central processing unit to provide a respective thread of execution for processing said body of data code, one of said threads including means for controlling the central processing unit to process the body of data code during a first series of spaced time intervals, and another of said threads including means to acquire control of the central processing unit periodically in response to said periodic activations of said interrupt operation so as to provide for execution of said another thread during a second series of spaced time intervals interleaved with said first series of spaced time intervals so as to process the same body of data cede concurrently with said processing by said one thread, whereby said threads execute concurrently in a multithreaded mode of operation and obtain control of the same central processing unit during respective interleaved alternate time intervals.

23. A disk store as set forth in claim 22 for use with a computer having an interactive user operable device and a video display monitor, and wherein said another thread comprises an editor including instructions executable interactively with a user in response to said user operable device for interactively editing said body of data, said another thread further comprising instructions for activating said monitor to display the effects of said interactive editing by said user operable device, whereby said editor of said another thread executes interactively with the user and executes concurrently with said one thread while the latter processes said body of data code.

24. A disk store as set forth in claim 22 for use with a computer having a user-operable device for transmitting information from a user and a monitor screen for displaying information to the user, wherein said another thread comprises executable instructions including means responsive to said user-operable device for entering said transmitted information and for interactively displaying on said screen the effects of said entered information, and said one thread comprises executable instructions including means to process said entered information concurrently in real time as the information is being transmitted by said user-operable device, whereby said another thread executes in the foreground interactively with and visibly to the user while concurrently therewith said one thread executes in the background so that the user perceives that both threads appear to be executing simultaneously whereas in reality the control of the central processor is alternately switching back and forth among the plurality of threads.

25. A disk store as set forth in claim 24 for use in a computer wherein said user-operable device is a keyboard having keys which may be struck repeatedly with a time interval between each pair of successive keystrokes, and wherein said one thread of instructions is executed during said time intervals between succesive keystrokes on the keyboard, whereby a user may enter information at the keyboard while concurrently therewith the entered information is being processed in real time by said another thread of instructions.

26. A computer-readable storage means encoded with executable instructions constituting computer operating software for preemptive multithreaded execution of a program having a plurality of instruction threads by a desktop computer having a microprocessor with an interrupt operation and a clock for periodically activating said interrupt operation, said software comprising:

thread scheduling means responsive to each activation of said interrupt operation to take control of the microprocessor from one of said threads and thereby preempt the execution of said one thread and to pass control of the microprocessor to another of said threads of said program for execution of said another thread, and means operable after each execution of said another thread to return control of the microprocessor from said another thread to said one thread for resumption of the execution of said one thread at the point where it was preempted, whereby at least two threads of the same program are concurrently active with said thread scheduling means periodically switching control of the same microprocessor preemptively from said one thread to said another thread so that the user perceives that both threads of instructions appear to be executing simultaneously.

27. A computer-readable storage disk encoded with executable instructions constituting operating software for preemptive multithreaded execution of a program having a plurality of concurrently executable instruction threads for processing the same body of data by a computer including a microprocessor having an interrupt operation, memory means for storing a body of data, input means for initiating execution of one of said instruction threads to process said stored body of data, and clock means for periodically activating said interrupt operation, said operating software comprising:

first software means responsive to periodic activation of said interrupt operation to cause the microprocessor to preemptively interrupt execution of said one thread and to execute another of said threads of said program whereby said another thread processes said body of data while the body of data is stored in said memory means, and second software means to cause the microprocessor to discontinue execution of said another thread and to resume execution of said one thread so as to resume processing said stored body of data at the point in the body of data where said one thread was previously interrupted, whereby said threads of the same program execute concurrently on the same microprocessor with said clock means periodically activating said interrupt operation to cause said microprocessor to preemptively switch execution from said one thread to said another thread periodically so that the user perceives that both threads appear to be executing simultaneously to process the same body of data.

28. A disk as set forth in claim 27 for use with a computer having a user-operable device for transmitting information from a user and a monitor screen for displaying information to the user, wherein said another thread comprises instructions executable in response to said user-operable device for entering said transmitted information and for interactively displaying on said screen the effects of said entered information, and said one thread comprises instructions executable to process said entered information concurrently in real time as the information is being transmitted by said user-operable device, whereby said another thread executes in the foreground interactively with and visibly to the user while concurrently therewith said one thread executes in the background so that the user perceives that both threads appear to be executing simultaneously notwithstanding that control of the central processor is alternately switching back and forth among the plurality of threads of the same program.

29. A disk as set forth in claim 28 for use in a computer wherein said user-operable device is a keyboard having keys which may be struck repeatedly with a time interval between each pair of successive keystrokes, and wherein said one thread of instructions is executed during said time intervals between succesive keystrokes on the keyboard, whereby a user may enter information at the keyboard while concurrently therewith the entered information is being processed in real time by said one thread of instructions.

30. A computer-readable disk memory having a surface formed with a plurality of binary patterns constituting a multithreaded word processing program executable by a computer having a keyboard, a buffer for storing words of a language, a central processor and a clock-driven periodically-activated interrupt operation providing a plurality of series of spaced timeslices with the timeslices of each series interleaved with the timeslices of at least one other series, said multithreaded word processing program comprising a plurality of sets of instructions with each set executable to provide a respective thread of execution and with each thread having a respective task to perform, a first of said sets of instructions executable to provide a first thread of execution having control of the central processor during each successive timeslice of a first series of timeslices with successive portions of the task of said first thread performed during respective successive timeslices of said first series, said first set of instructions comprising lexical means for checking the spelling of words stored in said buffer, said first thread of execution being periodically preempted at each termination of a timeslice of said first series by said clock activation of said interrupt operation, and a second of said sets of instructions executable to provide a second thread of execution and responsive to said periodic preemptions to acquire control of the central processor during successive timeslices of a second series of timeslices with successive portions of the task of said second thread performed during respective succesive timeslices of said second series, said second set of instructions comprising editor means responsive to said keyboard for entering words into said buffer, whereby a preemptive multithreading mode of operation is provided for the concurrent execution of said instruction threads with said lexical means checking the spelling of said entered words in real time while concurrently therewith said editor means is entering additional words into said buffer.

31. A disk memory as set forth in claim 30 for use in a computer also having a video display, and wherein said editor means is responsive to a sequence of keyboard keystrokes at spaced time intervals, said lexical means executing during time intervals between keystrokes, each keystroke of a subset of said keykeystrokes corresponding to a respective alphanumeric character, and means responsive to each of said alphanumeric keystrokes for immediately displaying on said video display the respective alphanumeric character corresponding to said keystroke, whereby said first thread of execution checks the spelling of said words stored in said buffer in real time between keystrokes concurrently with the entry and display of said additional words by said second thread of execution.

32. A computer-readable element encoded with executable instructions constituting a word processing program to control the execution of a computer having a keyboard, an interrupt operation, a clock timer for periodically activating said interrupt operation, and memory means for storing words of a language, said encoded executable instructions comprising a first thread of instructions executable by the computer and including means to check the spelling of said stored words, and a second thread of instructions for preemptively taking control of the computer in response to said periodic activations of said interrupt operation by said clock timer and including means responsive to said keyboard to enter words into said memory means.

33. A computer-readable element as set forth in claim 32 for use with a computer also having a video display, and wherein said second thread includes instructions responsive to a sequence of keyboard keystrokes at spaced time intervals, said first thread executing during time intervals between keystrokes, each keystroke of a subset of said keykeystrokes corresponding to a respective alphanumeric character, and said second thread includes instructions responsive to each of said alphanumeric keystrokes for immediately displaying on said video display the respective alphanumeric character corresponding to said keystroke, whereby said first thread of execution checks the spelling of said words stored in said memory means in real time between keystrokes concurrently with the entry and display of said additional words by said second thread of execution.

34. A computer-readable disk memory having a surface formed with a plurality of binary patterns constituting a multithreaded application program executable by a computer having a keyboard, a buffer for storing data words, a central processor and a clock-driven periodically-activated interrupt operation providing a plurality of series of spaced timeslices with the timeslices of each series interleaved with the timeslices of at least one other series, said multithreaded application program comprising a plurality of sets of instructions with each set executable to provide a respective thread of execution and with each thread having a respective task to perform, a first of said sets of instructions executable to provide a first thread of execution having control of the central processor during each successive timeslice of a first series of timeslices with successive portions of the task of said first thread performed during respective successive timeslices of said first series, said first set of instructions comprising means for processing said data words stored in said buffer, said first thread of execution being periodically preempted at each termination of a timeslice of said first series by said clock activation of said interrupt operation, and a second of said sets of instructions executable to provide a second thread of execution and responsive to said periodic preemptions to acquire control of the central processor during successive timeslices of a second series of timeslices with successive portions of the task of said second thread performed during respective successive timeslices of said second series, said second set of instructions comprising means responsive to said keyboard for entering data words into said buffer, whereby a preemptive multithreading mode of operation is provided for the concurrent execution of said instruction threads with said first thread processing said entered data words in real time while concurrently therewith said second thread is entering additional data words into said buffer.

35. A disk memory as set forth in claim 34 wherein said first thread of execution comprises instructions constituting a spreadsheet subprogram.

36. A disk memory as set forth in claim 34 wherein said first thread of execution comprises instructions constituting a database subprogram.

37. A computer-readable element encoded with executable instructions constituting an application program to control the execution of a computer having a keyboard, an interrupt operation, a clock timer for periodically activating said interrupt operation, and memory means for storing data, said encoded executable instructions comprising a first thread of instructions executable by the computer and including means to process said stored data, and a second thread of instructions for preemptively taking control of the computer in response to said periodic activations of said interrupt operation by said clock timer and including means responsive to said keyboard to enter data into said memory means.

38. A computer-readable element as set forth in claim 37 wherein said first thread of execution comprises instructions constituting a spreadsheet subprogram.

39. A disk memory as set forth in claim 37 wherein said first thread of execution comprises instructions constituting a database subprogram.

40. A computer-readable storage element containing an interactively multithreading application program having a plurality of threads of instructions executable to control the operation of a desktop computer including a microprocessor, a memory, a keyboard, an interrupt, a clock periodically activating the interrupt, an interrupt service routine responsive to each activation of the interrupt to preempt a currently executing thread and to take control of the microprocessor and to determine whether the keyboard has been struck, and a video monitor, said application program comprising:

a first set of instructions executable by said microprocessor to provide a first thread of execution, at least a second set of instructions executable by said microprocessor to provide at least a second thread of execution, the execution of said first thread being periodically preempted at predetermined equally spaced time instants by said interrupt service routine in response to repeated activations of said interrupt by said clock, said second thread being responsive to invocations by said interrupt service routine to take control of the microprocessor at each of those activations of said interrupt operation when said interrupt service routine has determined that the keyboard has been struck, said second thread including means for entering a code into the memory in response to each keystroke of a sequence of successive keystrokes on said keyboard with a time interval between the keystrokes of each pair of successive keystrokes, said second thread also including means for displaying the entered code on said video monitor immediately in response to each keystroke on said keyboard, said first thread including means for processing said entered code, whereby said threads execute concurrently in an interleaved relation with said first thread repeatedly processing said entered code during said time intervals between successive keystrokes.

41. A computer-readable storage element containing a multithreading application program having a plurality of threads of instructions executable to control the operation of a desktop computer including a microprocessor, a memory, a user-interactive input/output device, an interrupt, a clock periodically activating the interrupt, and an interrupt service routine responsive to each activation of the interrupt to take control of the microprocessor and to determine if a user has operated said input/output device, said application program comprising:

a first set of instructions executable by said microprocessor to provide a first thread of execution, at least a second set of instructions executable by said microprocessor to provide at least a second thread of execution, the execution of said first thread being periodically preempted at predetermined equally spaced time instants by said interrupt service routine in response to repeated activations of said interrupt by said clock, said second thread being responsive to invocations by said interrupt service routine to take control of the microprocessor at each of those activations of the interrupt when the interrupt service routine has determined that the input/output device has been operated, said second thread including means interactive with a user for controlling said input/output device for transmitting input/output data code in relation to said computer, said first thread including instructions executable to perform a subtask, whereby said threads execute concurrently in an interleaved relation with said first thread repeatedly performing said subtask during the time intervals between successive invocations of said second thread.

* * * * *

UNITED STATES PATENT AND TRADEMARK OFFICE
CERTIFICATE OF CORRECTION

| | | |
|---|---|---|
| PATENT NO. | : 5,694,603 | |
| APPLICATION NO. | : 07/496282 | |
| DATED | : December 2, 1997 | |
| INVENTOR(S) | : Martin G. Reiffin | |

It is certified that error appears in the above-identified patent and that said Letters Patent is hereby corrected as shown below:

Column 19, line 66, "cede" should be changed to --code--.

Signed and Sealed this
First Day of May, 2012

David J. Kappos
*Director of the United States Patent and Trademark Office*